Feb. 18, 1958  L. GAMBLE  2,823,769
EMERGENCY BRAKING ATTACHMENT FOR MOTOR TRUCKS AND THE LIKE
Filed March 3, 1955
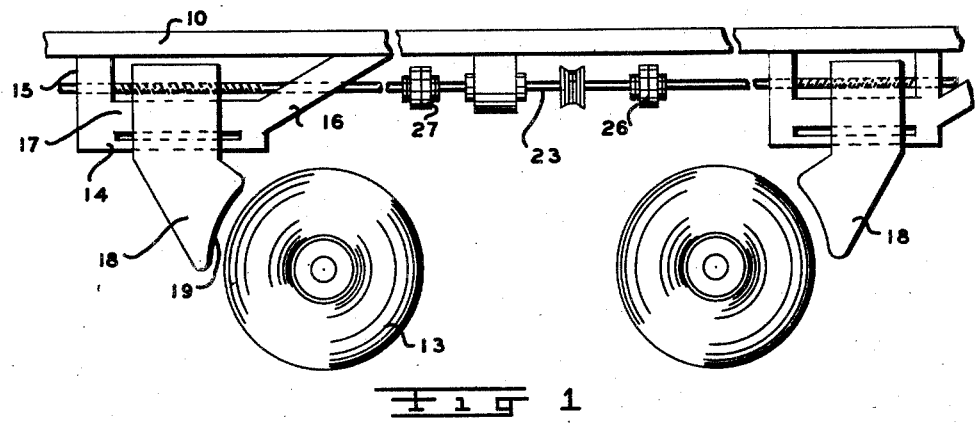
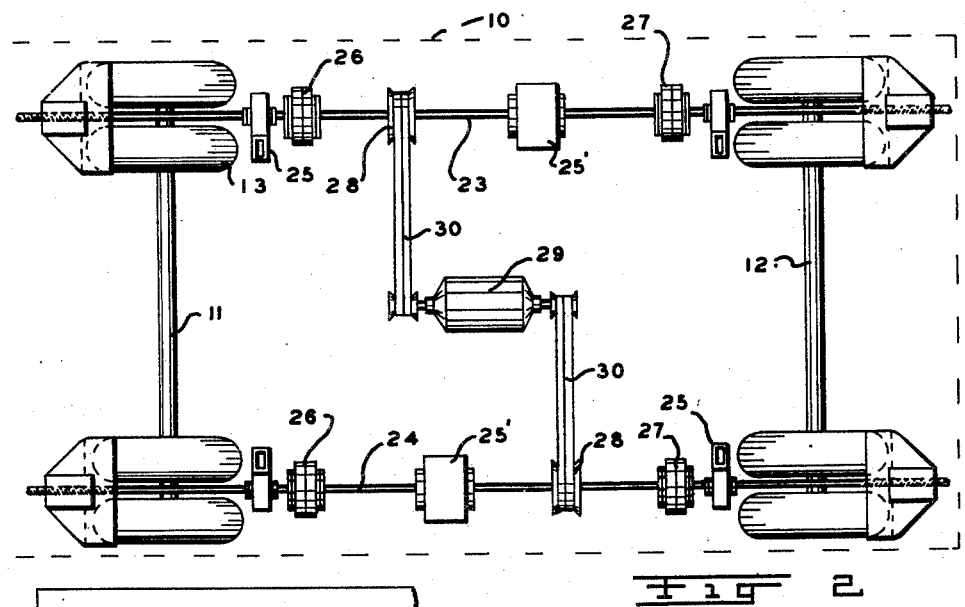
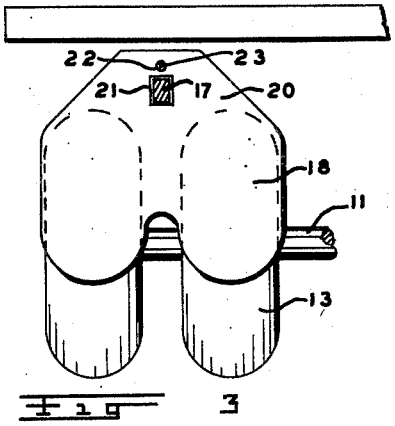
INVENTOR
LAFAYETTE GAMBLE
BY *Francis J. Klempay*
ATTORNEY

2,823,769

EMERGENCY BRAKING ATTACHMENT FOR MOTOR TRUCKS AND THE LIKE

Lafayette Gamble, Bolivar, Pa.

Application March 3, 1955, Serial No. 491,872

3 Claims. (Cl. 188—2)

This invention relates to road vehicles and more particularly to an emergency braking attachment for motor trucks, trailers, and the like which employ rubber-tired wheels and which may normally be heavily loaded for highway travel. Many highway accidents result from the failure of the built-in braking systems of such trucks and trailers or from the inability of such braking systems to cope with the very large inertia forces resulting from the occasional negligent failure of the driver to control the speed of his vehicle on long and steep grades by the normal method of shifting down the transmission between the engine and power wheels. It is an object of the present invention to provide an inexpensive yet practical emergency braking assembly for vehicles of the kind described which will be operative, when required, to quickly apply a very effective braking action to such vehicles in the event of failure or inadequacy of the regular brakes on the vehicle.

A further object of the invention is a provision of emergency braking apparatus for the general purposes outlined above which can be readily and inexpensively attached to practically all existing highway trucks and trailers, and which is automatically operative to distribute retarding forces among each of the road wheels to which emergency braking apparatus is applied. Thus, in the case of semi-trailers for example, having tandem axles and thus four road-engaging wheels, the apparatus of my invention, while quite simple and inexpensive, is operative to apply quickly restraining force to each of the four wheels of the trailer.

The above general objects of my invention are accomplished by providing a large exposed brake shoe for each of the selected road-bearing wheels of a truck or trailer and by providing power operated means to forcibly move these shoes into controlled pressure engagement with the outer peripheries of these wheels, the brake shoes being contoured transversely and arcuately complimentary to the outer shape of the tires on these wheels. The large area of contact together with the increased friction resulting from the contact of the tire treads makes for most effective braking action.

The above and other objects and advantages of the invention will become apparent upon consideration of the following specification and the accompanying drawing wherein I have disclosed a preferred embodiment of the invention.

In the drawing:

Figure 1 is a fragmentary side elevation of a flat bed trailer having tandem axles to which has been applied the emergency braking attachment of my invention;

Figure 2 is a fragmentary plan view of the assembly of Figure 1; and

Figure 3 is an end elevation of one of the brake shoes used in the assembly of Figures 1 and 2.

Referring now to the drawing, the reference numeral 10 designates the frame or bed structure of a conventional motor truck or trailer having a plurality of rubber tired wheel assemblies 13 mounted on axles 11 and 12.

The axles 11 and 12 are mounted in supporting relation to the frame 10 by conventional spring suspension means, not shown.

Mounted on the frame 10, adjacent each of the plurality of wheel assemblies 13 is a bracket 14 which comprises upwardly extending mounting portions 15 and 16 and a horizontally disposed elongated track-like portion 17. The mounting portions 15 and 16 are rigidly secured to the frame 10 by bolts or other suitable means, not specifically designated.

Slidably mounted on the track portions 17 of each of the brackets 14 are brake shoe members 18, which, in accordance with the teachings of the invention, are provided with arcuate contact surface portions 19 having compound contours to have close fitting engagement with the wheel assemblies 13 both circumferentially and transversely thereof. The arrangement is such that when the brake shoes 18 are moved into contact with the wheel assemblies 13 the outer tread portion of the tires make a large area frictional contact with the contoured surfaces of the brake shoes 18 which is effective in applying a substantial retarding force to the wheels 13 to supply the desired emergency or supplementary braking action.

As shown in Figure 3, the brake shoes 18 have upwardly extending portions 20 provided therein with openings 21 for the slidable reception of the track portions 17 of mounting brackets 14. Above the opening 21 in each of the brake shoes 18 there is provided a second opening 22 which is threaded internally for engagement with one end portion of a threaded operating rod or shaft 23 or 24. The operating shafts are journaled in the brackets 14, at each side of the frame 10, and by additional journal supports 25 and 25'.

Intermediate the ends of the operating shafts 23 and 24 there are provided pulleys (or sprockets) 28 which are drivingly connected with a motor 29 by means of suitable belts (or chains) 30. Thus, when the motor 29 is energized the shafts 23 and 24 are rotated simultaneously and equally to actuate the brake shoe members 18 in the desired manner. And in this respect it will be understood that the operating shafts 23 and 24 are threaded oppositely at opposite ends, so that rotation of the shafts will cause the shoes 18 to move simultaneously toward or away from their associated wheel assemblies.

Interposed between the several brake shoe members 18 and the drive pulleys 28, on the operating shafts 23 and 24, are torque limiting friction slip clutches 26 and 27. The arrangement is such that the operating power applied each of the brake shoes is applied independently through one of the clutches 26 or 27.

Clutches 26 and 27 serve a two-fold purpose. Thus, where the several wheel assemblies 13 are of different diameter, due to uneven wear upon the tires, for example, the brake shoes will tend to come into non-uniform pressure contact. However, in accordance with the teachings of the invention, the clutch driving the first contacting brake shoe will begin to slip as the remaining shoes continue to move into braking contact with the adjacent tires, and this will continue until all brake shoes are in uniform pressure contact with the several wheel assemblies. In addition, the clutches afford a safety limit upon the braking pressure which may be applied, to avoid damaging the tires and/or components of the braking system.

Preferably the drive motor 29 is a high power electrical motor of the general type used for starting internal combustion engines, for example. It is contemplated that the motor 29 will be appropriately connected with the electrical system of the vehicle upon which the emergency braking apparatus is installed, and that suitable emergency controls are provided within the cab of the vehicle so that the operator thereof may properly energize the motor 29 when necessary or desirable.

It should thus be understood that I have accomplished the objects initially set forth. I have provided a novel and highly simplified emergency braking assembly for installation in trucks and other standard motor and trailer vehicles for supplementary and standby emergency use. One of the advantageous features of the invention resides in the inherent versatility of the system. The same may be readily installed as an accessory or attachment on most standard commercial haulage vehicles in a minimum of time, and with a minimum capital expenditure.

Another of the advantageous features of my invention resides in the highly effective braking or retarding force obtained thereby. Thus, the large contact area provided by the contoured brake shoe members 18, acting against the outer peripheral surface portions or tread of the rubber tires of the vehicle provide for extremely efficient braking; and, of course, the radius arm through which the braking forces act is quite large, as compared to ordinary built-in braking equipment.

The braking system of my invention is also provided with substantial safety features by means of the torque limiting friction slip clutches 26 and 27. These clutches not only prevent the application of excessively high braking pressures, but the even application of braking pressure is assured through the overrunning characteristics of the slip clutches after the limiting force has been reached. Thus, even though the tires 13 are unevenly worn and some of the brake shoes will tend to come into braking contact before others, the final braking force will be evenly distributed so that proper control of the vehicle may be maintained during emergency braking.

It should be understood, however, that the specific embodiment herein illustrated and described is intended to be representative only, as many changes may be made therein without departing from the clear teachings of the invention. Reference should therefore be had to the following appended claims in determining the full scope of the invention.

I claim:

1. In combination with a vehicle of the type having a frame structure and a plurality of rubber tired wheel assemblies, a system for braking said vehicle when the regular brakes thereof fail comprising a plurality of brackets mounted on said frame structure adjacent said wheel assemblies, said brackets having track-like portions thereon, a plurality of contoured brake shoe members slidably mounted on said track-like portions for movement toward and away from said wheel assemblies, threaded operating shafts for said brake shoe members, electric motor means drivingly connected with said operating shafts, and torque limiting friction slip clutches interposed in said operating shafts for each of said wheel assemblies for limiting the braking force applied to said wheel assemblies, said brake shoe members being adapted to have friction contact with substantial peripheral surface or tread portions of said wheel assemblies.

2. Apparatus according to claim 1 further characterized by said vehicle having tandem wheel assemblies spaced longitudinally on said frame structure, said operating rods being positioned on opposite sides of said frame structure and having oppositely threaded end portions engaging said brake shoe members, the arrangement being such that interconnected pairs of said brake shoe members are adapted upon rotation of said operating shafts to move simultaneously toward or away from each other, said motor means being drivingly interconnected with said shafts intermediate the threaded ends thereof, and each of said shafts having torque limiting friction slip clutches adjacent each threaded end portion and on opposite sides of the driving interconnection with said motor means.

3. In combination with a vehicle of the type having a frame structure and a plurality of rubber tired wheel assemblies, a system for braking said vehicle when the brakes thereof fail comprising a plurality of brackets mounted on said frame structure adjacent said wheel assemblies, said brackets having track-like portions thereon, a plurality of contoured brake shoe members slidably mounted on said track-like portions for movement toward and away from said wheel assemblies, driving means drivingly connected with said brake shoe members, said brake shoe members having arcuate surfaces of substantial length for frictionally engaging elongated peripheral portions of said wheel assemblies and power limiting members interposed in the driving connection between said motor means and each of said brake shoe members, said brake shoe members being adapted to have friction contact with substantial peripheral surface or tread portions of said wheel assemblies.

References Cited in the file of this patent

UNITED STATES PATENTS

| | | |
|---|---|---|
| 817,606 | Yancey | Apr. 10, 1906 |
| 1,315,003 | Austin | Sept. 2, 1919 |
| 1,449,499 | Davis | Mar. 27, 1923 |
| 1,513,586 | Davis | Oct. 28, 1924 |
| 2,515,468 | Piron | July 18, 1950 |